(No Model.) 3 Sheets—Sheet 2.
W. E. TREADWELL & C. W. BLACK.
CORN HARVESTER.
No. 448,697. Patented Mar. 24, 1891.
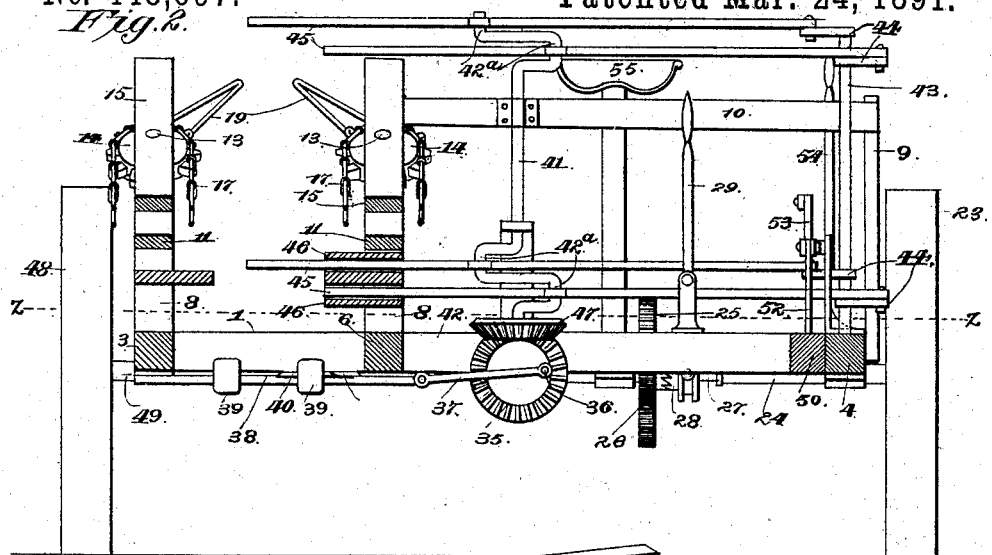
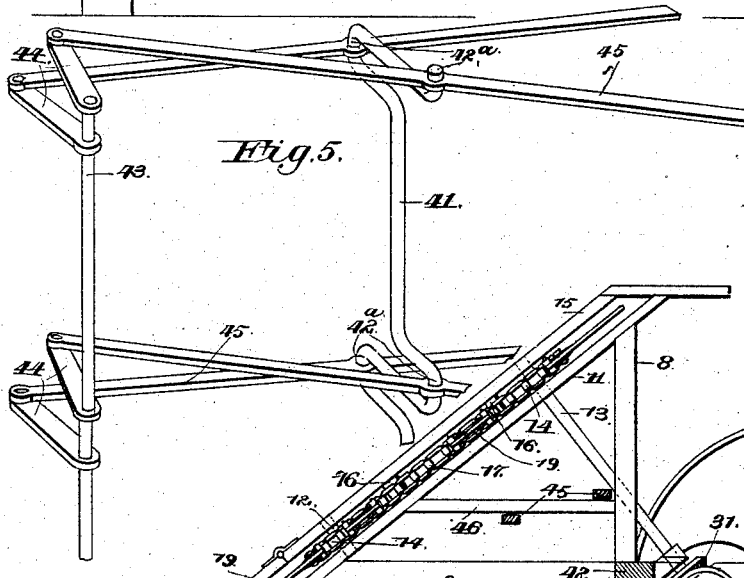
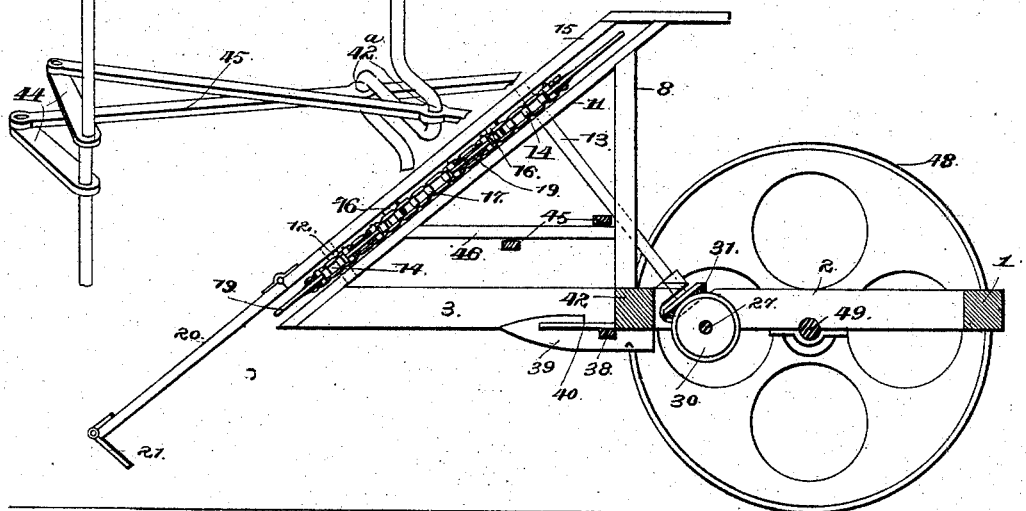
Witnesses
M. Fowler
Wm. Bagger
Inventors
Walter E. Treadwell
and Corydon W. Black
By their Attorneys,
C. A. Snow & Co.

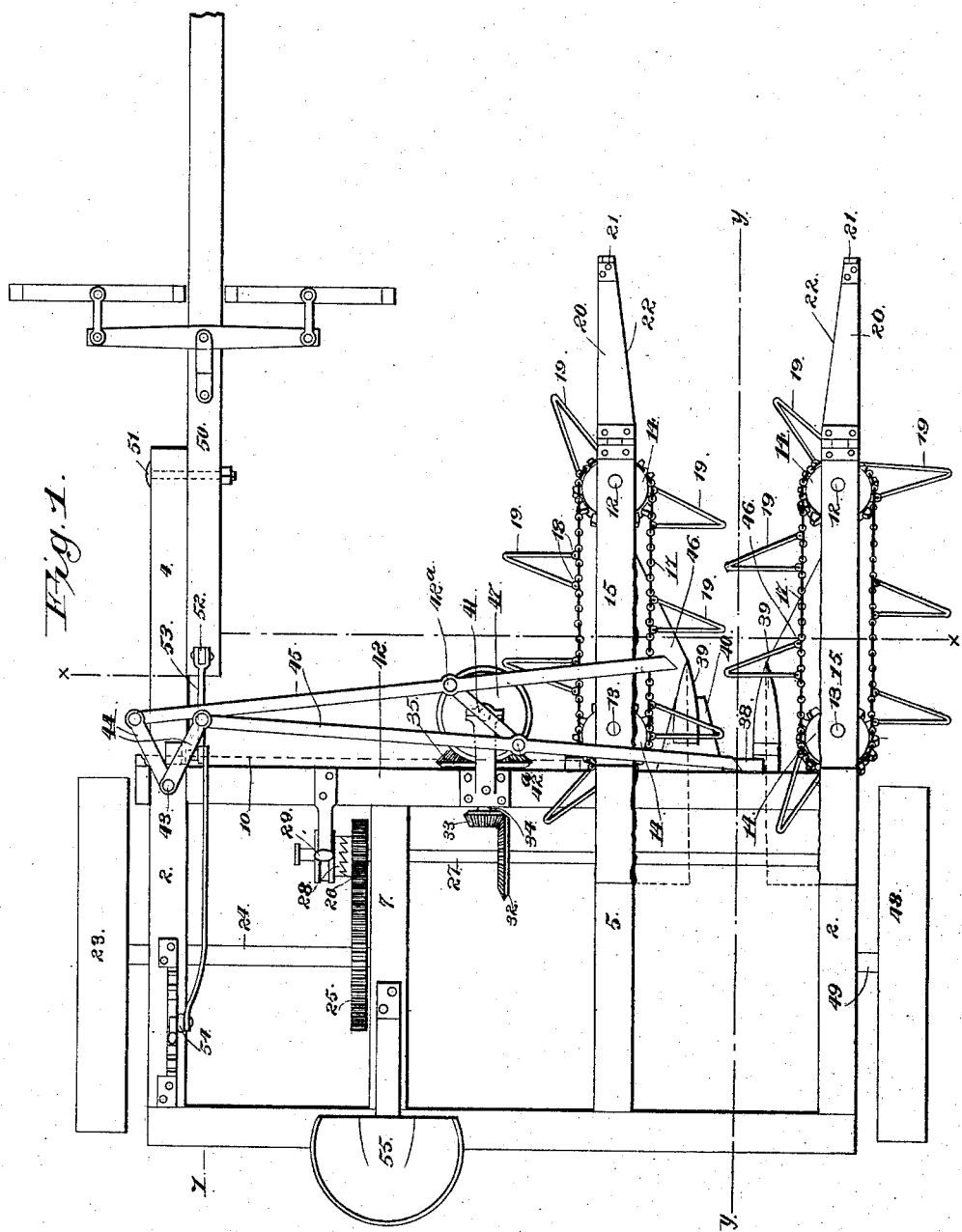

(No Model.) 3 Sheets—Sheet 3.
W. E. TREADWELL & C. W. BLACK.
CORN HARVESTER.
No. 448,697. Patented Mar. 24, 1891.
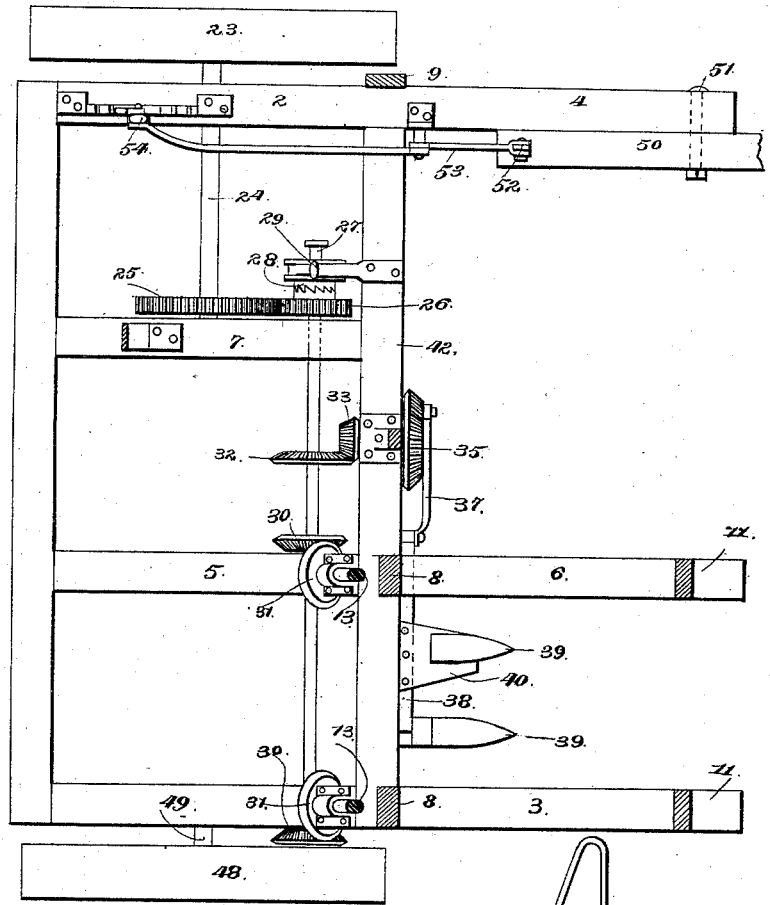
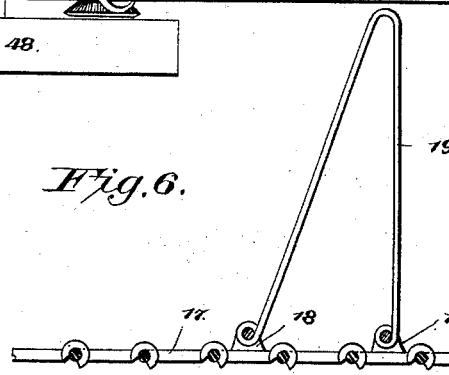
Witnesses
M. Fowler
Wm. Bagger
By their Attorneys,
Inventors
Walter E. Treadwell and
Corydon W. Black
C. A. Snow & Co.

UNITED STATES PATENT OFFICE.

WALTER E. TREADWELL AND CORYDON W. BLACK, OF ANTHONY, KANSAS.

CORN-HARVESTER.

SPECIFICATION forming part of Letters Patent No. 448,697, dated March 24, 1891.

Application filed January 8, 1890. Serial No. 336,297. (No model.)

*To all whom it may concern:*

Be it known that we, WALTER E. TREADWELL and CORYDON W. BLACK, citizens of the United States, residing at Anthony, in the county of Harper and State of Kansas, have invented a new and useful Corn-Harvester, of which the following is a specification.

This invention relates to corn-harvesters; and it has for its object to construct a machine of this class, which shall be simple, durable, and efficient in operation.

With these ends in view the invention consists in the improved construction, arrangement, and combination of parts, which will be hereinafter fully described, and particularly pointed out in the claims.

In the drawings hereto annexed, Figure 1 is a plan view of a machine embodying our improvements. Fig. 2 is a vertical transverse sectional view taken on the line $xx$ in Fig. 1. Fig. 3 is a vertical sectional view taken on the line $yy$ in Fig. 1. Fig. 4 is a horizontal sectional view taken on the line $zz$ in Fig. 2. Fig. 5 is a detail view of the beaters or packers and their operating mechanism. Fig. 6 is a detail view of one of the endless carriers.

Like numerals of reference indicate like parts in all the figures.

1 designates the main frame of our improved corn-harvester, which is approximately rectangular in shape and the side pieces of which 2 2 are extended in front of said frame, so as to form brackets 3 and 4. The said frame is also provided with a cross-piece 5, which is extended in front, so as to form a bracket 6 and an additional cross-piece 7, the purpose of which will be presently set forth. The side piece 2 and the cross-piece 5 are provided with vertical brackets or uprights 8 8, and the side piece 2, at the opposite end of the frame, is likewise provided with an upright 9, which is connected with the adjacent upright 8 by means of a horizontal frame-bar 10. The front ends of the brackets 3 and 6 are connected with the upper ends of the uprights 8 8 by the inclined frame-bars 11, in which are journaled the shafts 12 13, the upper ends of which carry sprocket-wheels 14. The upper or rear shafts 13 are extended in a downward direction and have bearings in the side beam 2 and cross-beam 5 of the main frame, respectively. The upper ends of the shafts 12 and 13 are journaled in the fenders 15, which are connected to the inclined bars 11 by means of brackets 16.

17 17 designate endless chains, which are arranged upon the sprocket-wheels 14 of the two sets of shafts 12 13. Said endless chains are composed of links of ordinary construction, several of which are provided with lugs 18, to which arms or carriers 19 are suitably attached. Said carriers, as illustrated in Fig. 6 of the drawings, may be constructed of metallic rods or wire, bent to the desired shape, and having both ends attached to the lugs 18, extending from links of the chain, which said links may be adjacent to each other or spaced by one or more intermediate links, as may be preferred. We desire it to be understood, however, that we do not limit ourselves to arms or carriers of this construction, inasmuch as others might be employed that would prove equally efficient.

To the lower ends of the fenders 15 are hinged the guards 20, the lower ends of which are provided with runners 21. These guards are flaring upon the inner adjacent sides, as will be seen at 22 in Fig. 1 of the drawings, for the purpose of engaging the stands of corn with certainty and regularity and guide the said stands to the endless carriers. In case obstructions, such as rocks, should be encountered the said guards, owing to their hinged connection with the fenders, will yield in an upward direction and the runners upon their under sides will then ride freely over such obstruction.

The cross-bar 7 and the adjacent side bar 2 of the machine are provided with bearings for a transverse shaft 24, the outer end of which carries the drive-wheel 23, and the inner end of which has a spur-wheel 25 meshing with a pinion 26 upon a transverse shaft 27, which is journaled in suitable boxes or bearings upon the frame-beams 7 and 5 and the side beam 2 adjacent to the latter.

The shaft 27 is located in front of the shaft 24, and the pinion 26 is, for convenience in backing and for the purpose of enabling the operating mechanism to be uncoupled when desired, connected to the shaft 27 by means of a clutch 28, adapted to be operated by means of a lever 29 of ordinary construction. The shaft 27 is provided with bevel-gears 30, meshing with pinions 31 upon the lower ends of the inclined shafts 13, by means of which motion may be imparted to the endless carriers, already described. The shaft 27 is provided with a bevel-gear 32, meshing with a pinion 33 upon the rear end of a short shaft 34, mounted in suitable bearings upon the front side of the rectangular main frame. The front end of the shaft 34 is provided with a bevel-gear 35, the face of which is provided with a wrist-pin 36, connected by a pitman 37 with the cutter-bar 38, which is mounted to slide in the guards 39, which are of ordinary construction. The cutter-bar 38 carries the cutter 40, the sides of which are beveled, so as to have a shearing action with relation to the guard-fingers 39. A vertical shaft 41 is mounted in suitable bearings in the front piece 42 and the cross-piece 10 of the frame, and is provided near its upper and lower ends with cranks 42$^a$, which extend or project on opposite sides of the shaft. Another vertical shaft 43, arranged near the outer side of the frame, is provided with forwardly-extending links 44, to which are journaled the beaters or packers 45, which latter are connected with the cranks 42$^a$ of the shaft 41, so that by the rotation of the latter a horizontal vibratory motion will be imparted to the said beaters. The outer ends of the latter extend between the strippers 46 and above the fenders 15, the upper ends of which latter are extended horizontally in a rearward direction. The lower end of the vertical shaft 41 is provided with a pinion 47, meshing with the pinion 35 upon the front end of shaft 34. By attaching the inner ends of the beaters or packers 45 to the links 44, which are pivoted upon the vertical shaft 43, we avoid the friction incident to having the ends of the said beaters 45 slide through eyes or other bearings.

A supporting-wheel or grain-wheel 48 is mounted upon a stub-axle 49, extending from one side of the frame, as shown.

The tongue of the machine 50, to which the draft is attached, is connected pivotally to the forwardly-extending bracket 4 of the frame by means of a transverse bolt 51. The rear end of the tongue is connected by means of a pivoted rod 52 with one arm of a bell-crank lever 53, the other arm of which is suitably connected with an operating-lever 54, having a handle within convenient reach of the driver, whose seat 55 may be suitably mounted upon the rear part of the main frame. The operating-lever 54 is to be provided with a catch adapted to engage a segmental rack-bar, by means of which the said operating-lever may be secured in any position to which it may be adjusted. This mechanism is for the purpose of adjusting the front end of the machine vertically, so as to cut the cornstalks at the desired distance above the ground.

From the foregoing description, taken in connection with the drawings hereto annexed, the operation and advantages of our invention will be readily understood. The inclined flaring guards 22 are caused to travel on each side of the row of corn which is to be cut, guiding the stalks between the fenders 15 and into contact with the endless carriers, which serve to pick up any prostrate stalks and guide them in an upright position to the cutting mechanism. The beaters or packers serve to force the stalks into contact with the cutting mechanism, whereby they are severed in an obvious manner.

It is the intention to employ a suitable binding and bundle-ejecting mechanism in connection with this invention, but such mechanism forms no part of our present invention.

Having thus described our invention, what we claim is—

1. In a corn-harvester, the inclined frame-bars 11 and the fenders 15, having the endless carriers mounted between the said frame-bars and fender, in combination with the guards hinged to the lower ends of the fenders, having flaring inner sides and provided at their lower ends with shoes or runners adapted to ride over inequalities in the ground, substantially as described, for the purpose set forth.

2. In a corn-harvester, the combination of the frame having the forwardly-extending brackets 3 6 and the uprights 8 8, the inclined frame-bars connecting the upper ends of said uprights with the front ends of said brackets, the fenders supported upon and parallel to said inclined frame-bars, the endless carriers mounted between said frame-bars and fenders, and the guards hinged to the lower ends of the fenders and having flaring inner sides, and provided at their lower ends with shoes or runners adapted to ride over rocks and other obstructions upon the ground, substantially as set forth.

In testimony that we claim the foregoing as our own we have hereto affixed our signatures in presence of two witnesses.

WALTER E. TREADWELL.
CORYDON W. BLACK.

Witnesses:
H. M. DENLINGER,
WILL WARD.